US006978981B2

(12) United States Patent  (10) Patent No.: US 6,978,981 B2
Roos  (45) Date of Patent: Dec. 27, 2005

(54) TAPS FOR CONTROLLING LIQUID FLOW

(76) Inventor: Paul Francois Roos, 16 Bertie Avenue, 7475 Epping 2 (ZA)

( * ) Notice: Subject to any disclaimer, the term of this patent is extended or adjusted under 35 U.S.C. 154(b) by 170 days.

(21) Appl. No.: 10/474,302

(22) PCT Filed: Apr. 8, 2002

(86) PCT No.: PCT/IB02/01102

§ 371 (c)(1),
(2), (4) Date: Oct. 7, 2003

(87) PCT Pub. No.: WO02/081954

PCT Pub. Date: Oct. 17, 2002

(65) Prior Publication Data

US 2004/0135113 A1    Jul. 15, 2004

(30) Foreign Application Priority Data

Apr. 9, 2001  (ZA) ..................... 01/2896

(51) Int. Cl.$^7$ ............................. F16K 3/24
(52) U.S. Cl. .............. 251/334; 251/265; 251/296; 251/277
(58) Field of Search ............... 251/157, 162, 251/170, 214, 215, 264, 265, 277, 296, 333, 251/334

(56) References Cited

U.S. PATENT DOCUMENTS

| | | | |
|---|---|---|---|
| 246,132 A | * | 8/1881 | Hastings ................ 251/118 |
| 1,122,480 A | * | 12/1914 | Cooper ................ 251/265 |
| 1,245,516 A | * | 11/1917 | Scheelk ................ 251/333 |
| 2,976,009 A | * | 3/1961 | Hartmann ................ 251/332 |
| 3,330,294 A | * | 7/1967 | Manning et al. ........ 137/315.11 |
| 5,236,014 A | | 8/1993 | Buls et al. |

FOREIGN PATENT DOCUMENTS

SU            985525 A    12/1982

* cited by examiner

Primary Examiner—J. Casimer Jacyna
(74) Attorney, Agent, or Firm—Berenato, White & Stavish LLC

(57) ABSTRACT

The invention discloses a tap (10) for controlling liquid flow. The tap (10) has a tube (14) with first (16) and second (18) opposite open ends, an inlet opening (20) leading into the tube between the first and second open ends, and an outlet opening (16) defined by the first open end (16), which outlet opening (16) serves as an outlet from the tube (14). The tap (10) further includes a first valve seat (36), formed between the inlet opening (20) and the outlet opening (16), and a second valve seat (38), formed between the inlet opening (20) and the second open end (18). A closure member (42) is sealingly slidably movable in the tube (14) and is provided with a first circumferential sealing edge (60), the first sealing edge (60) being adapted to removably abut against the first valve seat (36). The closure member (42) is further provided with a second circumferential sealing edge (66), the second sealing edge (66) being adapted to removably abut against the second valve seat (38).

32 Claims, 2 Drawing Sheets

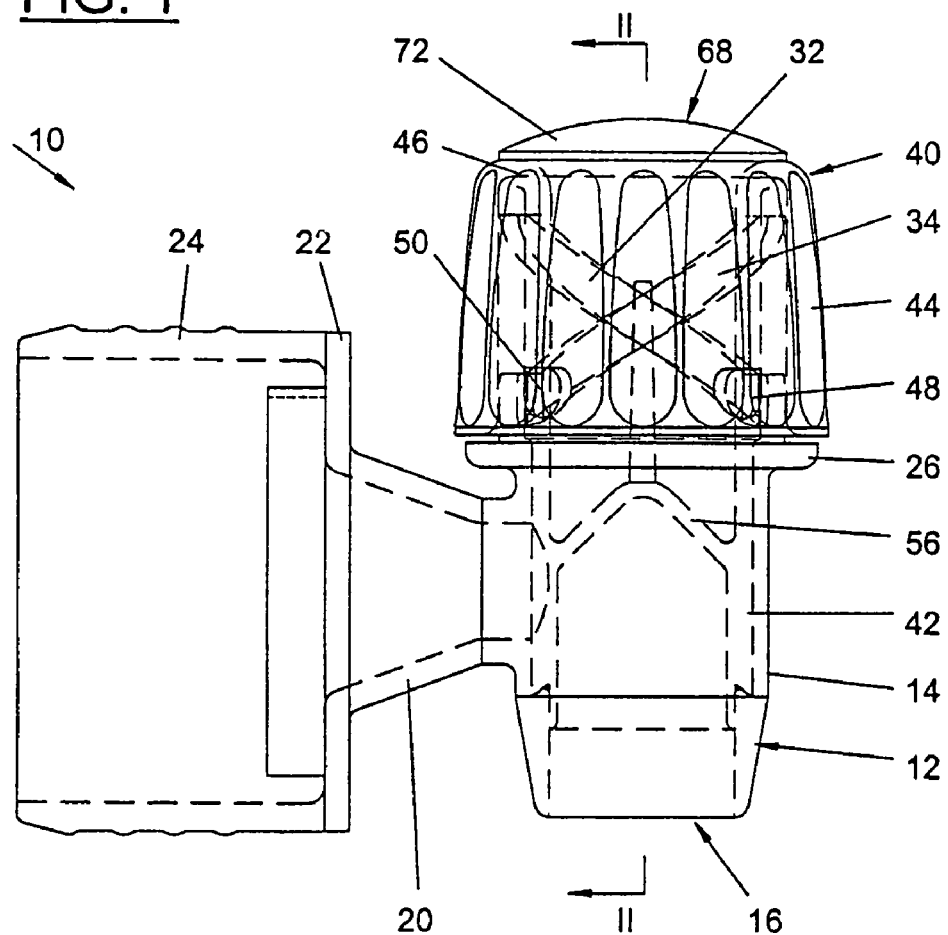
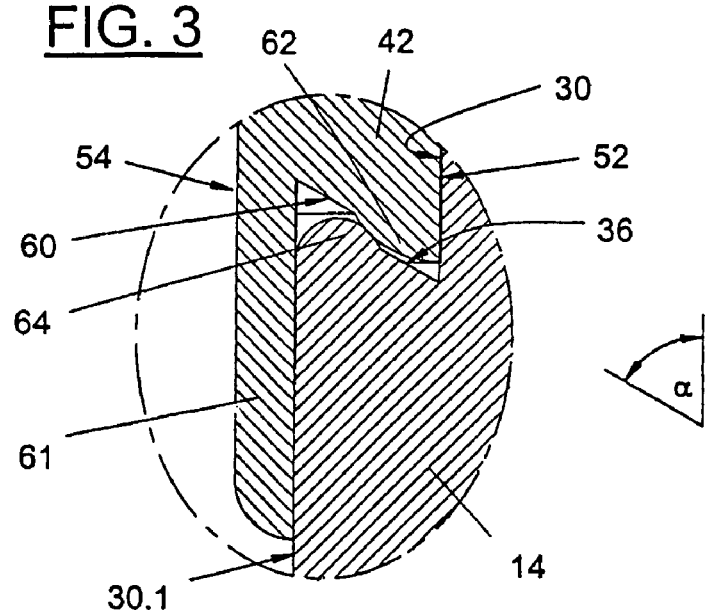

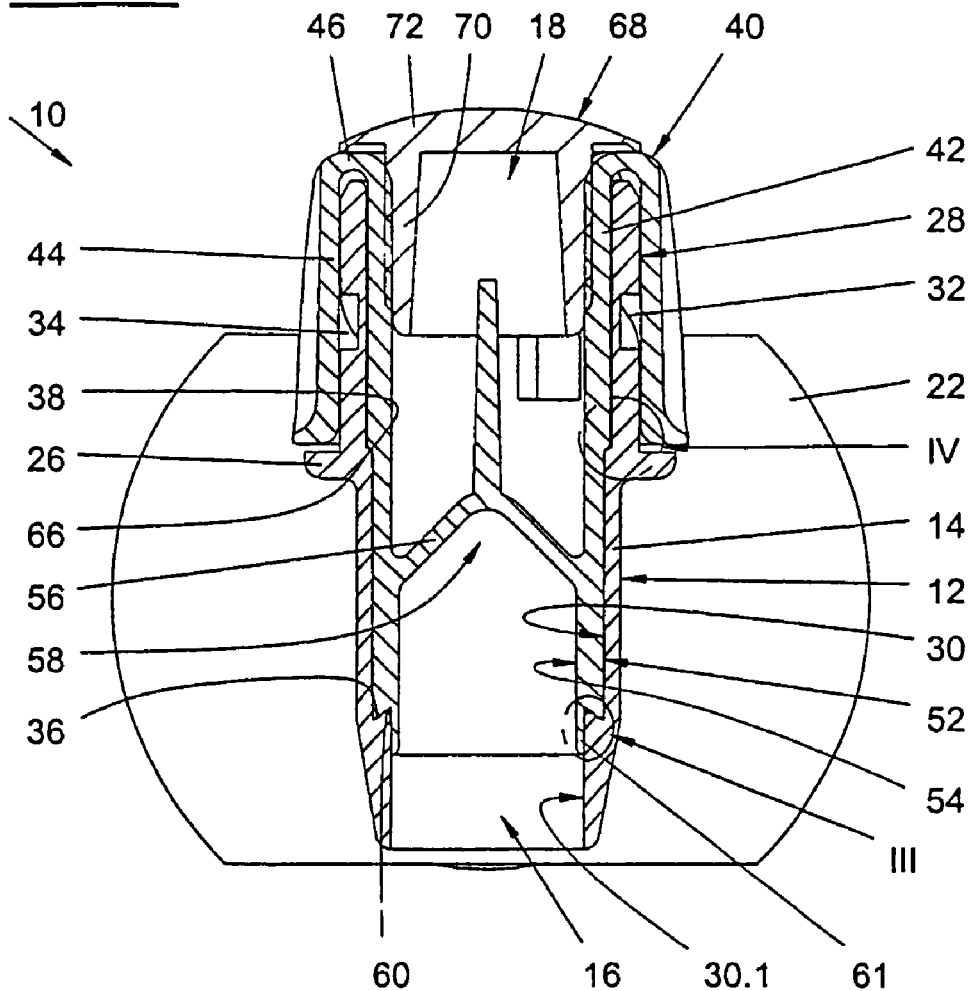
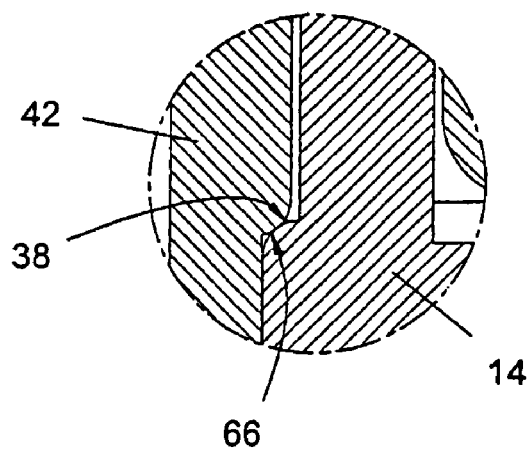

TAPS FOR CONTROLLING LIQUID FLOW

FIELD OF INVENTION

The present invention relates to taps for liquid flow control.

BACKGROUND TO INVENTION

The so-called "bag-in-box" containers are widely used to package wine, fruit juices and other liquids. The liquid is contained in a flexible pouch of plastics material and the pouch is placed into a cardboard box.

A tap is provided for opening the pouch and enabling controlled amounts of liquid to be dispensed. The entire tap can be secured to the pouch. Alternatively, a gasket or flange can be secured to the pouch and the tap can be placed loose in the cardboard box.

The tap should be simple in construction and inexpensive to make. It should not leak or drip and must not permit ingress of air into the bag.

It is an object of the present invention to provide a tap which meets the conditions set out above more successfully than other known taps.

SUMMARY OF INVENTION

According to the invention a tap for controlling liquid flow having a tube with first and second opposite open ends, an inlet opening leading into the tube between the first and second open ends, an outlet opening defined by the first open end, which outlet opening serves as an outlet from the tube, includes a first valve seat formed between the inlet opening and the outlet opening; a second valve seat formed between the inlet opening and the second open end; a closure member sealingly slidably movable in the tube; a first circumferential sealing edge provided on the closure member, the first sealing edge being adapted to removably abut against the first valve seat; and a second circumferential sealing edge provided on the closure member, the second sealing edge being adapted to removably abut against the second valve seat.

The closure member may be displaceable internally along the tube to cause the first sealing edge to move across the inlet opening from between a first or closed position, in which the first sealing edge of the closure member cooperates with the first valve seat to close off the inlet opening from the outlet opening and the second sealing edge cooperates with the second valve seat, into a second or open position in which the first and second sealing edges are spaced away from the first and second valve seats to permit liquid flow through the inlet opening into the tube and out through the outlet opening, and for closure of the outlet opening the reverse procedure taking place to cause the closure member to be moved back into the first or closed position.

The first valve seat and the first sealing edge may be adapted to deflect the closure member outwardly against the tube, when the closure member is in the closed position.

The first and second valve seats may be convexly curved.

The first valve seat may be provided with a convexly curved circumferential protuberance extending approximately half-way across the first valve seat.

The protuberance may be spaced away from an inner wall of the tube.

The first and second sealing edges may be convexly curved.

The first sealing edge may be provided with a convexly curved circumferential protuberance extending approximately half-way across the first sealing edge.

The protuberance may be located near to an outer wall of the closure member.

The first and second sealing edges may be adapted to have a small contact area with the first and second valve seats respectively.

The closure member and the tube may both be resilient, but the closure member may be less resilient to deformation than the tube.

A skirt may extend from the first sealing edge of the closure member towards the open end.

The skirt may be adapted to be in flush contact with a section of the inner wall of the tube when the closure member is in a closed position.

The closure member may form part of a plunger knob.

The tap may include guiding means for rotatably guiding the plunger knob along a spiral path.

The guiding means may include at least one spiral groove in the tube and at least one protrusion from the plunger knob slidingly engaged in the spiral groove(s).

Further according to the invention, a tap for controlling liquid flow having a tube with first and second opposite open ends, an inlet opening leading into the tube between the first and second open ends, an outlet opening defined by the first open end, which outlet opening serves as an outlet from the tube, includes a valve seat formed between the inlet opening and the outlet opening; a closure member sealingly slidably movable in the tube; a circumferential sealing edge provided on the closure member, the sealing edge being adapted to removably abut against the valve seat; and the valve seat and the sealing edge being adapted to deflect the closure member outwardly against the tube, when the closure member is in a closed position.

The closure member may be displaceable internally along the tube to cause the sealing edge to move across the inlet opening from between a first or closed position, in which the sealing edge of the closure member cooperates with the valve seat to close off the inlet opening from the outlet opening, into a second or open position in which the sealing edge is spaced away from the valve seat to permit liquid flow through the inlet opening into the tube and out through the outlet opening, and for closure of the outlet opening the reverse procedure taking place to cause the closure member to be moved back into the first or closed position.

The tap may include a second valve seat formed between the inlet opening and the second open end and a second circumferential sealing edge provided on the closure member being adapted to removably abut against the second valve seat.

The first and second valve seats may be convexly curved.

The first valve seat may be provided with a convexly curved circumferential protuberance extending approximately half-way across the first valve seat.

The protuberance may be spaced away from an inner wall of the tube.

The first and second sealing edges may be convexly curved.

The first sealing edge may be provided with a convexly curved circumferential protuberance extending approximately half-way across the first sealing edge.

The protuberance may be located near to an outer wall of the closure member.

The first and second sealing edges may be adapted to have a small contact area with the first and second valve seats respectively.

The closure member and the tube may both be resilient, but the closure member may be less resilient to deformation than the tube.

A skirt extends from the first sealing edge of the closure member towards the open end.

The skirt may be adapted to be in flush contact with a section of the inner wall of the tube when the closure member is in a closed position.

The closure member may form part of a plunger knob.

The tap may include guiding means for rotatably guiding the plunger knob along a spiral path.

The guiding means may include at least one spiral groove in the tube and at least one protrusion from the plunger knob slidingly engaged in the spiral groove(s).

BRIEF DESCRIPTION OF DRAWINGS

The invention will now be described by way of example with reference to the accompanying schematic drawings.

In the drawings there is shown in:

FIG. 1 a side view of a tap for liquid flow control in accordance with the invention;

FIG. 2 a sectional end view seen along arrows II—II in FIG. 1;

FIG. 3 on an enlarged scale, a view of the area indicated by arrow III in FIG. 2; and FIG. 4 on an enlarged scale, a view of the area indicated by arrow IV in FIG. 2.

DETAILED DESCRIPTION OF DRAWINGS

Referring to FIGS. 1 and 2, a tap in accordance with the invention, generally indicated by reference numeral 10, is shown. The tap 10 includes a hollow tubular body or barrel 12 having a cylindrical tube 14 with opposite open ends 16 and 18. Part-way along its length, the tube 14 has an integrally formed funnel 20 having a disc-like flange 22 and sleeve 24 at one end. The sleeve 24 is of larger diameter than the tube 14 and protrudes from the flange 22 opposite to the funnel 20. The sleeve 24 is adapted to be in push-fit with a pouch. The funnel 20 serves as an inlet to the tap 10 for liquid contained in the pouch, while the open end 16 serves as an outlet from the tap 10 for the liquid.

A circular collar 26 protrudes from the tube 14 approximately midway along its length.

The tube 14 has an outer wall 28 and an inner wall 30.

Between the collar 26 and the open end 18 of the tube 14, there is a double start spiral groove 32 and 34 formed into the outer wall 28. Each groove 32,34 extends through approximately 180°, i.e. a half turn over its full extent. The spiral grooves 32,34 start near the collar 26 and terminate just short of the open end 18 of the tube 14.

The barrel 12 further includes first and second valve seats 36,38 formed into the inner wall 30 of the tube 14. The first valve seat 36 is located between the funnel and the open end 16. The second valve seat 38 is spaced apart from the first valve seat 34 and is located between the funnel 20 and the open end 18. The valve seats 36,38 will be described in more detail hereinafter.

Through the open end 18 of the barrel 12 a plunger knob 40 is fitted onto the tube 14. The plunger knob 40 includes a closure member 42, an outer skirt 44, and a radially transverse end wall 46. The skirt 44 has two radially inwardly directed protrusions 48,50 on the inner surface thereof. The protrusions 48,50 are respectively slidably located in the grooves 32,34.

The closure member 42 is of generally round cylindrical form having an outer wall 52 and an inner wall 54 and midway along its length is internally closed by a transverse wall 56. The wall 56 has a conical recess 58 on its side facing towards the open end 16. The closure member 42, relatively near to its end facing the open end 16 of the barrel 12, is provided with a substantially conically inclined first sealing edge 60 being adapted to cooperate with the first valve seat 36, as is shown more clearly in FIG. 3. The first sealing edge 60 of the closure member 42 lies at an angle relative to the outer wall 52, which angle has been designated by "α" in FIG. 3. The first valve seat 36 is also substantially conically inclined having an angle relative to the inner wall 30 of the tube 14 identical to the angle "α".

The first sealing edge 60 is provided with a slight convexly curved circumferential protuberance 62. The valve seat 36 is also provided with a slight convexly curved circumferential protuberance 64. These convex protuberances 62,64 ensure continuous circumferential contact between the first valve seat 36 and the first sealing edge 60 when the tap 10 is closed.

A skirt 61 is provided extending from the first sealing edge 60 towards the open end 16. The skirt 61 extends beyond the first valve seat 36 and is adapted to be in flush contact with the section 30.1 of the inner wall 30 of the tube 14 when the plunger knob 40 is in the closed position.

The closure member 42, approximately mid-way along its length, further has a second sealing edge 66 on its outer wall 52 being adapted to cooperate with the second valve seat 38, as is shown more clearly in FIG. 4. Both the second valve seat 38 and second sealing edge 66 are convexly curved in sectional side view to ensure continuous circumferential contact between the second valve seat 38 and the second sealing edge 66 when the tap 10 is closed.

A closure cap 68, having a cylinder 70 and an end wall 72, is fitted onto the plunger knob 40 so as to close off the open end 18.

When the tap 10 is closed, as shown in FIG. 1, the sleeve 24 and funnel 20 are filled with liquid, as they are in communication with the interior of a pouch. When the plunger knob 40 is rotated in an anti-clockwise direction from the position illustrated in FIGS. 1 and 2, axial movement thereof occurs in addition to the turning movement due to sliding co-operation between the grooves 32,34 and the protrusions 48,50. Thus the closure member 42 is shifted away from the open end 16. The sealing edges 60,66 of the closure member 42 separate from the valve seats 36,38 and the closure member 42 uncovers the funnel 20. The plunger knob 40 is now in an open position and flow of liquid occurs through the funnel 20 into the barrel 12 and through the outlet open end 16 out of the tap 10.

When the plunger knob 40 is rotated in a clockwise direction, the closure member 42 is moved towards the open end 16, back into the position shown in FIGS. 1 and 2. As the first sealing edge 60 of the closure member 42 moves past the funnel 20, the funnel 20 is closed and there is a wiping action which minimises the possibility of the tap 10 dripping after it has been closed. Furthermore, the wiping action of the skirt 61 on the inner wall 30.1 also reduces dripping after the tap 10 is closed.

Thereafter, eventually, the sealing edges 60,66 respectively re-engage the valve seats 36,38 to close the open end 16 and to stop flow of liquid through the barrel 12 and the open end 16 entirely. As the first sealing edge 60 and the first valve seat 36 are urged into contact during rotation of the plunger knob 40 towards the closed position of the tap 10, the first valve seat 36 tends to deflect the first sealing edge 60 of the closure member 42 outwardly, thereby causing the outer wall 52 of the closure member 42 to engage against the inner wall 30 of the tube 14. This is allowed by the resiliency of the plastics material used to produce the barrel 12 and the plunger knob 38. The outward deflection of the first sealing edge 60 also causes the skirt 61 into tight flush contact with the inner wall 30.1. This assists in the prevention of any leakage occurring once the tap 10 is closed.

Thus there are three seals in action in the vicinity of the first valve seat 36 between the interior of the pouch and the open end 16. The first seal exists where the first sealing edge 60 and the first valve seat 36 are in engagement, the second seal exists where the outer wall 52 of the closure member 42 engages against the inner wall 30 of the tube 14, and the third seal exists where the skirt 61 is in flush contact with the inner wall 30.1 of the tub 14. Furthermore, the contact between the second sealing edge 66 and the second valve seat 38 prevents any leakage towards the open end 18, between the barrel 12 and the plunger knob 38, caused by capillary forces.

The portion of the grooves 32,34 which are closest to the collar 26, can be of lesser pitch than the remaining portions of the grooves 32,34 or can extend circumferentially for a short distance. Thus there is little or no tendency for the plunger knob 40 to rotate from the position it is left in when the tap 10 is fully closed.

If desired, the sealing edges 60,66 and the valve seats 36,38 can be in engagement before the plunger knob 40 has rotated into its furthest closed position.

The two-start grooves 32,34 can be replaced by a single-start groove or by a groove having more than two starts.

There is at all times contact between the closure member 42 and the tube 14 due to the tight sealing fit of the closure member 42 and the tube 14. As explained above, the slidable sealing fit of the closure member 42 in the tube 14, and the length over which these components contact, forms a seal such that there is little prospect of leakage between the plunger knob 38 and the barrel 12. This seal also effectively minimises leakage when the tap 10 is open.

What is claimed is:

1. A tap (10) for controlling liquid flow having a tube (14) with first (16) and second (18) opposite open ends, an inlet opening (20) leading into the tube between the first and second open ends, an outlet opening (16) defined by the first open end (16), which outlet opening (16) serves as an outlet from the tube (14), the tap (10) being characterized thereby that it is adapted for use in bag-in-box containers containing consumable liquids and that it includes a first valve seat (36) formed between the inlet opening (20) and the outlet opening (16); a second valve seat (38) formed between the inlet opening (20) and the second open end (18); a closure member (42) sealingly slidably movable in the tube (14); a first circumferential sealing edge (60) provided on and integrally formed with the closure member (42), the first sealing edge (60) being adapted to removably abut against the first valve seat (36); and a second circumferential sealing edge (66) provided on and integrally formed with the closure member (42), the second sealing edge (66) being adapted to removably abut against the second valve seat (38).

2. A tap as claimed in claim 1, characterized thereby that the closure member (42) is displaceable internally along the tube (14) to cause the first sealing edge (60) to move across the inlet opening (20) from between a first or closed position, in which the first sealing edge (60) of the closure member (42) cooperates with the first valve seat (36) to close off the inlet opening (20) from the outlet opening (16) and the second sealing edge (66) cooperates with the second valve seat (38), into a second or open position in which the first (60) and second (66) sealing edges are spaced away from the first (36) and second (38) valve seats to permit liquid flow through the inlet opening (20) into the tube (14) and out through the outlet opening (16), and for closure of the outlet opening (16) the reverse procedure taking place to cause the closure member (42) to be moved back into the first or closed position.

3. A tap as claimed in claim 1, characterized thereby that the first valve seat (36) and the first sealing edge (60) are adapted to deflect the closure member (42) outwardly against the tube (14), when the closure member (42) is in the closed position.

4. A tap as claimed in claim 1, characterized thereby that the first (36) and second (38) valve seats are convexly curved.

5. A tap as claimed in claim 1, characterized thereby that the first valve seat (36) is provided with a convexly curved circumferential protuberance (64) extending approximately half-way across the first valve seat (36).

6. A tap as claimed in claim 5, characterized thereby that the protuberance (64) is spaced away from an inner wall (30) of the tube (14).

7. A tap as claimed in claim 1, characterized thereby that the first (60) and second (66) sealing edges are convexly curved.

8. A tap as claimed in claim 1, characterized thereby that the first sealing edge (60) is provided with a convexly curved circumferential protuberance (62) extending approximately half-way across the first sealing edge (60).

9. A tap as claimed in claim 8, characterized thereby that the protuberance (62) is located near to an outer wall (52) of the closure member (42).

10. A tap as claimed in claim 1, characterized thereby that the first (60) and second (66) sealing edges are adapted to have a small contact area with the first (36) and second (38) valve seats respectively.

11. A tap as claimed in claim 1, characterized thereby that the closure member (42) and the tube (14) are both resilient, but that the closure member (42) is less resilient to deformation than the tube (14).

12. A tap as claimed in claim 1, characterized thereby that a skirt (61) extends from the first sealing edge (60) of the closure member (42) towards the open end (16).

13. A tap as claimed in claim 12, characterized thereby that the skirt (61) is adapted to be in flush contact with a section (30.1) of the inner wall (30) of the tube (14) when the closure member (42) is in a closed position.

14. A tap as claimed in claim 1, characterized thereby that the closure member (42) forms part of a plunger knob (40).

15. A tap as claimed in claim 1, characterized thereby that it includes guiding means (32,34,48,50) for rotatably guiding the plunger knob (40) along a spiral path.

16. A tap as claimed in claim 15, characterized thereby that the guiding means (32,34,48,50) includes at least one spiral groove (32,34) in the tube (14) and at least one protrusion (48,50) from the plunger knob (40) slidingly engaged in the spiral groove(s) (32,34).

17. A tap (10) for controlling liquid flow having a tube (14) with first (16) and second (18) opposite open ends, an inlet opening (20) leading into the tube (14) between the first (16) and second (18) open ends, an outlet opening (16) defined by the first open end (16), which outlet opening (16) serves as an outlet from the tube (14), the tap (10) being characterized thereby that it includes a valve seat (36) formed between the inlet opening (20) and the outlet opening (16); a closure member (42) sealingly slidably movable in the tube (14); a circumferential sealing edge (60) provided on the closure member (42), the sealing edge (60) being adapted to removably abut against the valve seat (36); and the valve seat (36) and the sealing edge (60) being adapted to deflect the closure member (42) outwardly against the tube (14), when the closure member (42) is in a closed position.

18. A tap as claimed in claim 17, characterized thereby that the closure member (42) is displaceable internally along the tube (14) to cause the sealing edge (60) to move across the inlet opening (20) from between a first or closed position, in which the sealing edge (60) of the closure member (42) cooperates with the valve seat (36) to close off the inlet opening (20) from the outlet opening (16), into a second or open position in which the sealing edge (60) is spaced away from the valve seat (36) to permit liquid flow through the inlet opening (20) into the tube (14) and out through the outlet opening (16), and for closure of the outlet opening (16) the reverse procedure taking place to cause the closure member (42) to be moved back into the first or closed position.

19. A tap as claimed in claim 17, characterized thereby that it includes a second valve seat (38) formed between the inlet opening (20) and the second open end (18) and a second circumferential sealing edge (66) provided on the closure member (42) being adapted to removably abut against the second valve seat (38).

20. A tap as claimed in claim 19, characterized thereby that the first (36) and second (38) valve seats are convexly curved.

21. A tap as claimed in claim 17, characterized thereby that the first valve seat (36) is provided with a convexly curved circumferential protuberance (64) extending approximately half-way across the first valve seat (36).

22. A tap as claimed in claim 21, characterized thereby that the protuberance (64) is spaced away from an inner wall (30) of the tube (14).

23. A tap as claimed in claim 19, characterized thereby that the first (60) and second (66) sealing edges are convexly curved.

24. A tap as claimed in claim 17, characterized thereby that the first sealing edge (60) is provided with a convexly curved circumferential protuberance (62) extending approximately half-way across the first sealing edge (60).

25. A tap as claimed in claim 24, characterized thereby that the protuberance (62) is located near to an outer wall (52) of the closure member (42).

26. A tap as claimed in claim 19, characterized thereby that the first (60) and second (66) sealing edges are adapted to have a small contact area with the first (36) and second (38) valve seats respectively.

27. A tap as claimed in claim 17, characterized thereby that the closure member (42) and the tube (14) are both resilient, but that the closure member (42) is less resilient to deformation than the tube (14).

28. A tap as claimed in claim 17, characterized thereby that a skirt (61) extends from the first sealing edge (60) of the closure member (42) towards the open end (16).

29. A tap as claimed in claim 28, characterized thereby that the skirt (61) is adapted to be in flush contact with a section (30.1) of the inner wall (30) of the tube (14) when the closure member (42) is in a closed position.

30. A tap as claimed in claim 17, characterized thereby that the closure member (42) forms part of a plunger knob (40).

31. A tap as claimed in claim 17, characterized thereby that it includes guiding means (32,34,48,50) for rotatably guiding the plunger knob (40) along a spiral path.

32. A tap as claimed in claim 31, characterized thereby that the guiding means (32,34,48,50) includes at least one spiral groove (32,34) in the tube (14) and at least one protrusion (48,50) from the plunger knob (40) slidingly engaged in the spiral groove(s) (32,34).

* * * * *